United States Patent Office 2,821,290
Patented Jan. 28, 1958

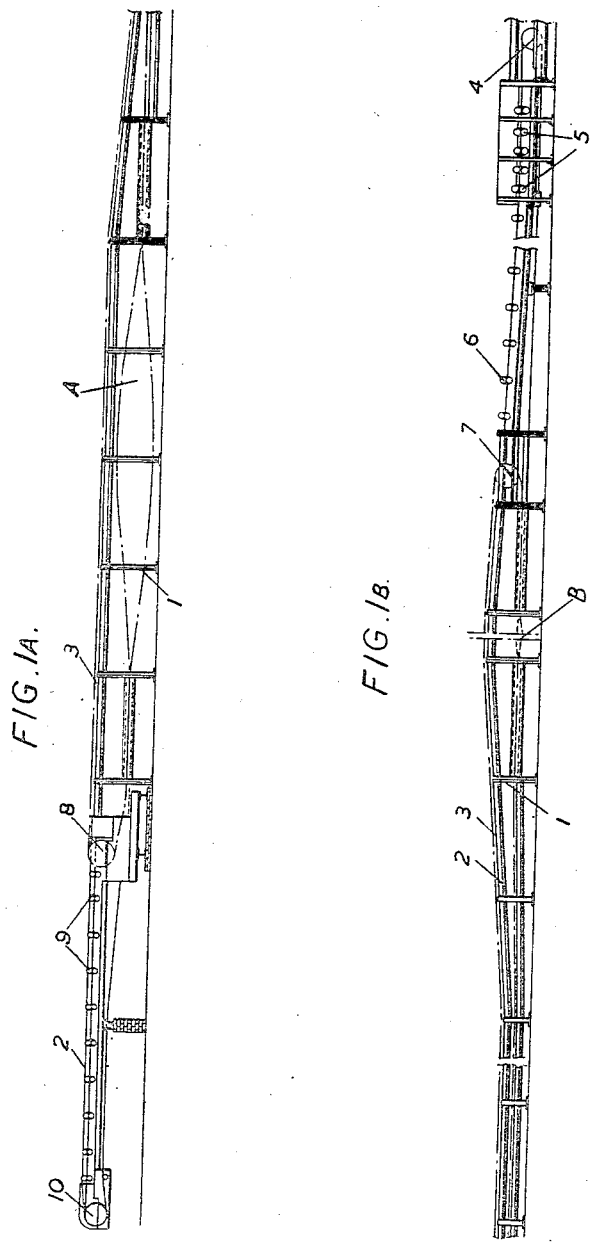

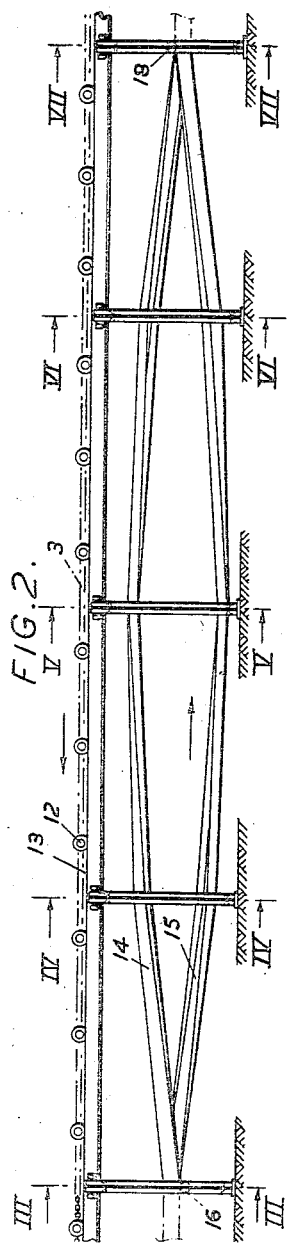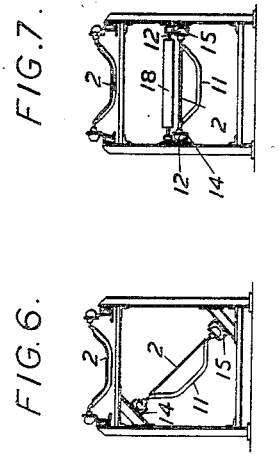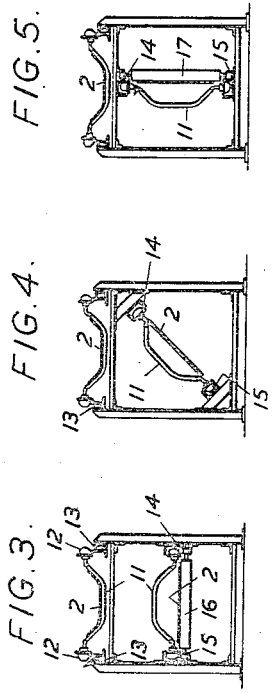

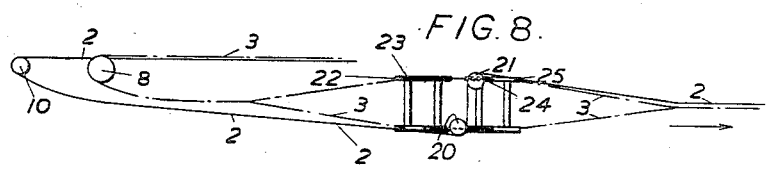
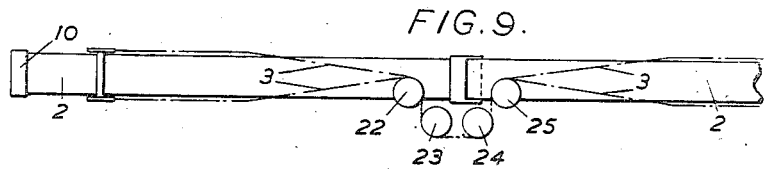
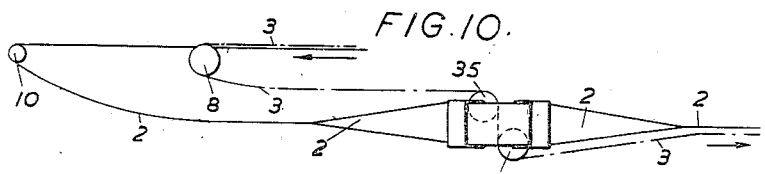
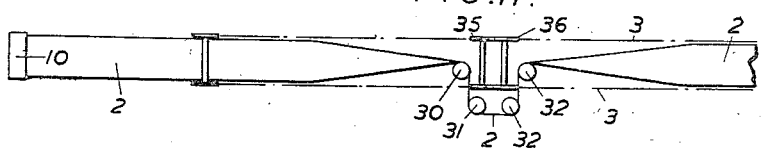
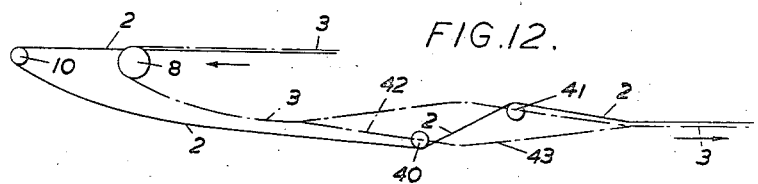
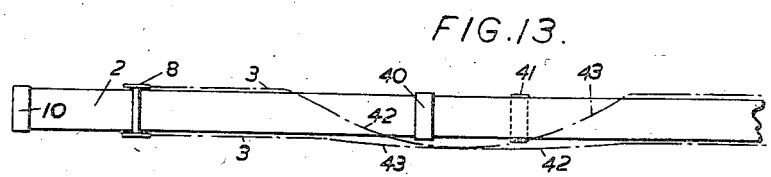
Inventor
ANGUS WELLESLEY DUNCAN

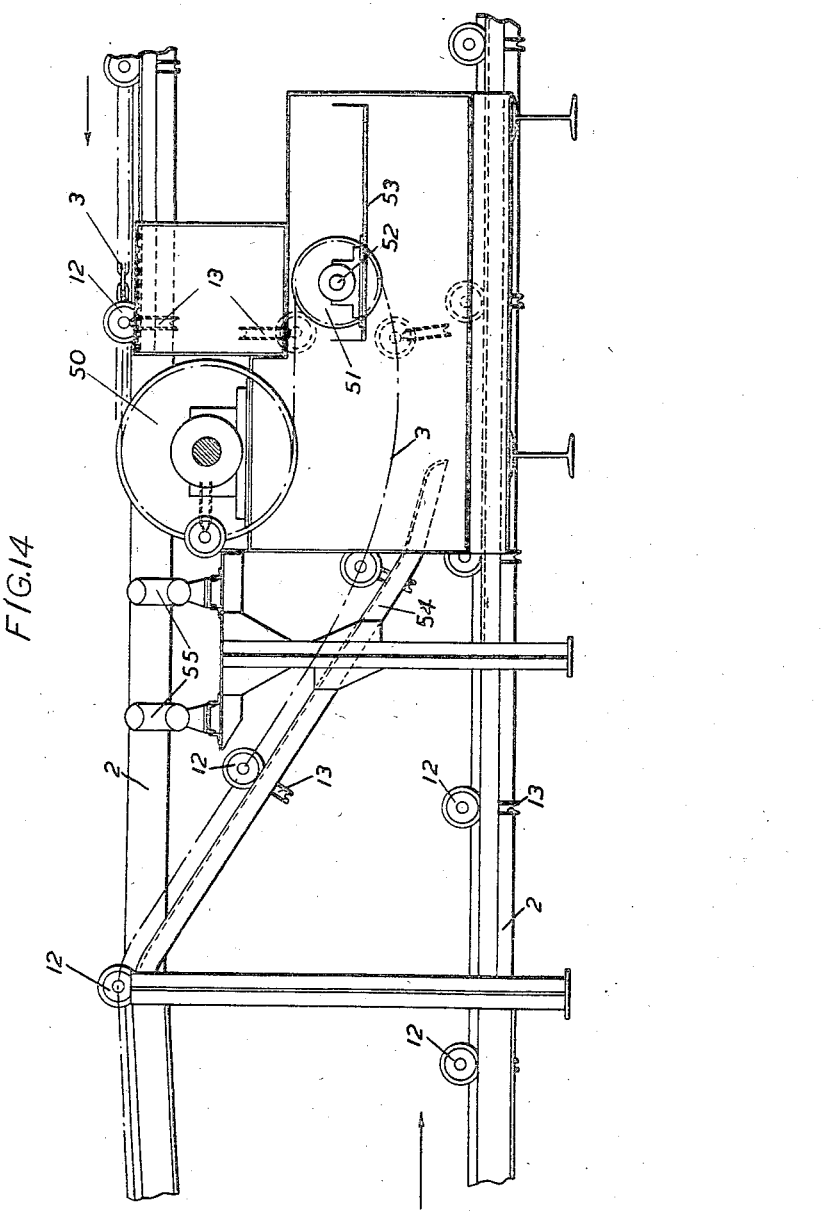

2,821,290

ENDLESS BELT TROUGH CONVEYOR

Angus Wellesley Duncan, Worcester, England, assignor to The Mining Engineering Company Limited, Worcester, England Application October 23, 1953, Serial No. 387,958

Claims priority, application Great Britain October 31, 1952

9 Claims. (Cl. 198—191)

Long distance conveyors are commonly of the type in which the material is carried on the transporting medium such as a belt or steel band, such transporting medium having the whole of the driving and initial tension transmitted through it.

This has led to the development of very special belts incorporating heavy cotton, rayon, nylon or steel wire cords and such belts are expensive initially. Also, as they are subjected to wear and tear in contact with the material carried, they have to be replaced at high cost.

It has been proposed to separate the tension element from the carrying element in belt conveyors by using steel wire ropes, flat link chains or the like working in conjunction with a belt or band of cheap and simple construction which is a carrying medium only and is not subjected to any of the tension necessary to drive the conveyor.

The present invention relates to belt conveyors of the type in which the carrying and tension elements are separate and it offers an arrangement having considerable economy in the use of materials, simple robust construction and driving means of relatively small size particularly adapted for use underground in mining practice.

From one aspect, the invention provides for the carrying and tension elements of an endless conveyor to be transposed in relation to one another at each end by twisting at least one element so that the carrying element is supported by the tension elements or, by means associated therewith on both runs of the conveyor.

From another aspect, an endless conveyor according to the invention comprises a carrying element on which the load is carried and a tension element to which the drive is applied and associated with means supporting the carrying element, the carrying element being above the tension element on both the top run and the bottom run, and means being provided at the ends of the conveyor to twist at least one of the elements for transposing the elements relatively to one another.

From yet another aspect, an endless conveyor according to the invention has a load-carrying element supported on cross members extending between a pair of cable-link chains having rollers running on a fixed track shaped to direct the cross-members beneath the load carrying element on the return strand of the conveyor so that the carrying element is supported over a substantial portion of the return track. Preferably the rollers are mounted on the ends of the cross members so that the load carrying element is supported on these rollers and no carrying load is taken by the tension elements. In some cases, however, the rollers may be attached to selected ones of the cross members (say every third cross member) or to the chains at points not associated with cross members.

The twisting of the element is preferably effected within the area which would be occupied by a conveyor of the same dimensions of which the elements are not twisted.

Preferably also both the load-carrying and the tension elements are twisted. They may be twisted together that is at the same position in the length of the conveyor and remain parallel to one another during the twist.

Other parts of the invention are embodied in the preferred forms which will now be described in some detail by way of example with reference to the accompanying drawings in which Figs. 1A and 1B together represent a side view of a preferred form of conveyor, Fig. 1A representing the delivery end and Fig. 1B representing the loading end, Fig. 2 is a side view to a larger scale of the portion of the conveyor over which the transposition of the carrying and tension elements takes place, Fig. 3 is a section on the line III—III of Fig. 2,
Fig. 4 is a section on the line IV—IV of Fig. 2,
Fig. 5 is a section on the line V—V of Fig. 2,
Fig. 6 is a section on the line VI—VI of Fig. 2,
Fig. 7 is a section on the line VII—VII of Fig. 2,
Fig. 8 is a diagrammatic side view of one end of a modified form of conveyor,
Fig. 9 is a plan view, of Fig. 8, the top run of the chain and belt being removed,
Fig. 10 is a diagrammatic side view of one end of another modified form,
Fig. 11 is a plan view of Fig. 10, the top run of the chain and belt being removed,
Fig. 12 is a diagrammatic side view of one end of a further modified form,
Fig. 13 is a plan view of Fig. 12, the top run of the chain and belt being removed, and
Fig. 14 is a side view of a portion of a conveyor illustrating an intermediate drive.

As shown in Figs. 1A and 1B the conveyor structure comprises a frame 1 within which runs the conveyor comprising an endless belt 2 forming a load carrying element and parallel cable link chains 3 forming the tension element. The belt 2 runs from an end drum 4 through a loading section in which the belt 2 runs on cushioning rollers 5 and thence on idler rollers 6 towards sprockets 7 over which the chains 3 run. The belt 2 and the chains 3 then run together on the top or conveying run to driving sprockets 8 around which the chains pass whilst the belt 2 continues over idler rollers 9 to a return drum 10. The belt then passes back on the return run towards the sprockets 8 and joins the chains 3. The chains and the belt then pass through the twisting section A in which they are twisted and transposed. From this twisting section, the belt and chains run together (with the belt entrained by the chains in the same way as on the top conveying run) to a second twisting section B where the belt and chains are again transposed. The chains then pass to and around the sprockets 7 whilst the belt passes on to and around the end drum 4.

The pair of chains 3 are connected at intervals by transverse cross bars 11 on which the belt rests when the belt and the chains run together. These transverse bars are trough shaped so that the belt is troughed when carried on the bars. Mounted on the ends of the cross bars are rotatable rollers 12 and the chains are connected to the axles of these rollers. The rollers run on parallel tracks 13 of the frame structure 1.

It will be noted that the load carrying belt is supported from the tracks 13 by the rollers 12 and the cross bars 11 and no portion of the conveyed load on the belt is transferred to or carried by the chains. At the same time, the belt is not subjected to any driving tension all of which is taken by the chains.

The belt and the chains are both twisted in the sections A and B. The frame structure as shown in Figs. 3 to 7 comprises a pair of helical tracks 14, 15, each of which passes from one side of the frame to the other in a helical twist. The rollers 12 run along these tracks so that the chains 3 lie in the tracks and the cross members 11 are gradually inverted as shown by the successive sections, Figs. 3 to 7. The belt 2 runs over an idler roller 16 at the beginning of the helical tracks and is also given a helical twist, running over a vertical idler roller 17 at the centre of the twisting section and under an idler roller 18 at the end of the helical tracks, taking a position above the cross members 11 at the end of the twisting section. Thereafter the belt 2 is supported on the cross members 11 on the return run of the belt in the same manner as on the top run. Towards the end of the return run the belt and chains pass through another twisting section B of opposite hand before passing round the return drum and sprockets respectively.

Alternative methods of transposing the belt and the chains by twisting one or other of them are schematically illustrated in Figs. 8 to 13. In the form illustrated in Figs. 8 and 9, the return run of the belt 2 is taken around belt drums 20 and 21 arranged horizontally with the drum 21 at a higher level than the drum 20. The chains 3 from the driving sprockets 8 pass around sprockets 22, 23, 24 and 25 arranged with their axes vertical and arranged to guide the chains to one side of the belt and then back into the run of the belt. The chains 3 passing round the sprockets 25 are below the belt level which has been raised by the drum 21 and the chains are then guided beneath the belt 2 for the remainder of the return run.

The arrangement shown in Figs. 10 and 11 is in principle the same as that of Figs. 8 and 9 but the belt is twisted instead of the chains. The belt is twisted into a vertical plane and passes around vertical belt drums 30, 31, 32 and 33, so as to be guided outside the normal track for a short distance and then back into the normal track. The chains pass around sprockets 35, vertically downward to below the belt level and then around sprockets 36 and below the belt which henceforward is carried forward by the chains. In this form, the transverse carrier members must either be untroughed or be formed with a trough on both sides of the axis of the rollers since the trough which carries the belt on the top will be upside down on the return run.

In Figs. 12 and 13, the belt is raised by horizontal belt drums 40, 41 and the chains are twisted and carried to the outside of the normal track of the conveyor by twisted tracks 42, 43 which guide the chains and carriers outside the belt and from above the belt to below the belt.

Conveyors such as those described lend themselves readily to the provision of intermediate drives on either the top or bottom strand by separating the chains and cross bars from the belt for a short distance and passing the chains through a driving unit, the belt being supported for this distance on idler rollers. Such an arrangement of intermediate drive for the top strand is illustrated in Fig. 14. The chains 3 are passed around a sprocket 50 rotated in the usual way by a motor through a fluid coupling, worm gear box and internal gear coupling. The chains then pass around snub wheels 51 rotatable on a horizontal axle 52 and slidable along a support 53 for the adjustment of the chain tension. The chain then passes with a free fall on to an inclined track 54 by which it is led back into the normal track of the conveyor. The belt 2 continues in its normal track being supported as necessary by standard conveyor idlers 55.

The use of cables of the cable type as the tension members of the conveyors makes possible the use of simple ratchet locks suitably spaced along the conveyor structure to prevent run back in the event of chain breakage. Locks on both upper and lower chain elements may be interconnected.

It will be appreciated further that the use of simple cable chain tension elements makes possible the transmission of relatively large power to the chains by means of sprockets of small dimensions relative to the very large driving drums or rope wheels now required for belts of known type and this in turn makes possible the use of gear boxes of small size and low overall reduction.

Many variations are possible without departing from the invention which employs chain elements under driving tension to support a belt or the like not subjected to driving tension on both the carrying and return strands of the conveyor, the chain element and the belt being transposed at or near each terminal drum.

For example, the rollers associated with the cross members of the chain element running on rails in the conveyor structure may be replaced by rollers mounted on the structure on which the chains run directly.

I claim:

1. An endless conveyor having forward and return runs superimposed one above the other and comprising a belt forming a load-carrying element, a tension member having transverse elements of troughed form supporting said belt along its upper run, means for driving the tension member and means for twisting the tension member through 180° adjacent to each end of the conveyor whereby the belt is also supported on the transverse members along its lower run.

2. An endless conveyor having forward and return runs superimposed one above the other and comprising a belt forming a load-carrying element, a tension member having transverse elements of troughed form supporting said belt along its upper run, means for driving the tension member, means for twisting the tension member through 180° adjacent to each end of the conveyor and means for twisting the belt through 180° adjacent to each end of the conveyor whereby the belt is also supported on the transverse members on its lower run and has the same face uppermost on both upper and lower runs.

3. An endless conveyor having forward and return runs superimposed one above the other and comprising a belt forming a load-carrying element, a tension member having transverse elements of troughed form supporting said belt along its upper run, means for driving the tension member and means for twisting the tension member longitudinally through 180° adjacent to each end of the conveyor, whereby the belt is also supported on the transverse member along its lower run.

4. An endless conveyor having forward and return runs superimposed one above the other and comprising a belt forming a load-carrying element, a tension member having transverse elements of troughed form supporting said belt along its upper run, means for driving the tension member, means for twisting the tension member longitudinally through 180° adjacent to each end of the conveyor and means for twisting the belt longitudinally through 180° adjacent to each end of the conveyor whereby the belt is also supported on the transverse members on its lower run and has the same face uppermost on both upper and lower runs.

5. An endless conveyor having forward and return runs superimposed one above the other and comprising a belt forming a load-carrying element, a tension member having transverse elements of troughed form supporting said belt along its upper run, means for driving the tension member and means for twisting the tension member and the belt simultaneously through 180° adjacent to each end of the conveyor whereby the belt is also supported on the transverse members on its lower run and has the same face uppermost on both upper and lower runs.

6. An endless conveyor having forward and return runs superimposed one above the other and comprising a belt forming a load-carrying element, a tension member having transverse elements of troughed form supporting said belt along its upper run, means for driving the tension member and means for twisting the tension member and the belt simultaneously through 180° adjacent to each end of the conveyor within the area occupied by a conveyor of the same dimensions in which the elements are not twisted whereby the belt is also supported on the transverse members on its lower run and has the same face uppermost on both upper and lower runs.

7. An endless conveyor having forward and return runs superimposed one above the other and comprising a belt forming a load-carrying element, a tension member having transverse elements of troughed form supporting said belt along its upper run, means for driving the tension member, means for twisting the tension member through 180° adjacent to each end of the conveyor and means for twisting the belt through 180° at the same position in the length of the conveyor, said tension member and said belt remaining parallel to one another during the twists.

8. An endless conveyor according to claim 7 in which said tension member is supported by rollers running on a fixed track, said track having helically formed portions to twist said tension member.

9. An endless conveyor according to claim 7 in which said twisting means are located in the lower run of said conveyor.

References Cited in the file of this patent

UNITED STATES PATENTS

| | | |
|---|---|---|
| 1,970,842 | Crossen | Aug. 21, 1934 |
| 2,489,440 | Vallance | Nov. 29, 1949 |
| 2,582,881 | Mitchell | Jan. 15, 1952 |
| 2,594,342 | Pettyjohn | Apr. 29, 1952 |
| 2,732,058 | Nigra et al. | Jan. 24, 1956 |